United States Patent

Dalla Torre et al.

[11] Patent Number: 5,859,147
[45] Date of Patent: Jan. 12, 1999

[54] AMORPHOUS, TRANSPARENT POLYAMIDE COMPOSITIONS AND ARTICLES HAVING REDUCED FLAMMABILITY

[75] Inventors: Hans Dalla Torre, Domat/Ems; Manfred Hewel, Rodels, both of Switzerland

[73] Assignee: EMS-Inventa AG, Zurich, Switzerland

[21] Appl. No.: 857,289

[22] Filed: May 16, 1997

Related U.S. Application Data

[63] Continuation-in-part of Ser. No. 360,319, Dec. 21, 1994, abandoned.

Foreign Application Priority Data

Dec. 23, 1993 [CH] Switzerland ............... 03 840/93-0

[51] Int. Cl.$^6$ ................. C08L 61/02; C08K 5/49
[52] U.S. Cl. ................. 525/400; 524/119; 524/123
[58] Field of Search ................. 525/400; 524/119, 524/123

[56] References Cited

U.S. PATENT DOCUMENTS

| | | |
|---|---|---|
| 3,789,091 | 1/1974 | Anderson et al. |
| 3,849,368 | 11/1974 | Anderson et al. |
| 3,966,838 | 6/1976 | Feldmann et al. |
| 4,268,459 | 5/1981 | Hoffman ............... 524/119 |
| 4,388,431 | 6/1983 | Mauric et al. ............... 524/119 |
| 4,458,045 | 7/1984 | Mauric et al. ............... 524/119 |

FOREIGN PATENT DOCUMENTS

| | | |
|---|---|---|
| 44 06 857 | 6/1995 | Germany . |
| 92/13717 | 8/1992 | WIPO . |

OTHER PUBLICATIONS

*International Standard*, Plastics—Polyamide (PA) moulding and extrusion materials—Part 1: Designation, Reference No. ISO 1874–1:1992 (E).

*Primary Examiner*—Nathan M. Nutter
*Attorney, Agent, or Firm*—Venable; George H. Spencer; Ashley J. Wells

[57] ABSTRACT

A polyamide composition which is amorphous and transparent, which has reduced flammability, and which has reduced migration of flame-retardant additive so that it is film-free, includes at least one polyamide which contains cycloaliphatic monomer units and which is amorphous and transparent; and a flame-retardant additive which is present in an amount effective to reduced flammability of the polyamide composition, which is dissolved in the at least one polyamide, and which is at least one alkyl phosphonic acid compound having a general formula:

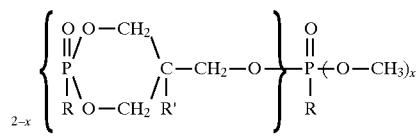

wherein R and R' each represent, independent of each other, an alkyl group having from 1 to 4 carbon atoms, and x=0 or 1. An article molded from this composition is transparent, has reduced flammability, and has reduced migration of flame-retardant additive so that it is film-free.

14 Claims, No Drawings

AMORPHOUS, TRANSPARENT POLYAMIDE COMPOSITIONS AND ARTICLES HAVING REDUCED FLAMMABILITY

CROSS-REFERENCE TO RELATED APPLICATIONS

The present disclosure is a continuation-in-part of U.S. patent application Ser. No. 08/360,319 filed Dec. 21, 1994 and now abandoned, and relates to the subject matter disclosed in Swiss Application No. 03 840/93-0 filed Dec. 23, 1993, the entire specifications of which are incorporated herein by reference.

BACKGROUND OF THE INVENTION

1. Field of the Invention

The invention relates to a polyamide composition which is amorphous and transparent, which has reduced flammability, and which is film-free, to a molded article produced from the polyamide composition, and to use of a flame-retardant additive to reduce flammability of polyamides and articles molded therefrom. In particular, the invention relates to use of a phosphonic acid compound as a flame-retardant additive for a polyamide which contains cycloaliphatic monomer units and which is amorphous and transparent.

2. Background of the Related Art

Flame-retarding additives for polymers, particularly polyamides, are well known in the prior art. Such additives include melamine compounds, especially melamine cyanurate, cyanoguanidine, thiourea, magnesium and aluminum hydroxide, ammonium phosphate, halogenated organic compounds, especially brominated organic compounds, in particular in combination with heavy metal salts, and phosphorous by itself and/or in combination with halogen-containing compounds.

These additives are not suited for transparent polyamides and copolyamides, however, since they are deleterious to the transparency of such compositions and articles manufactured therefrom. For example, migration of flame retardant to the surface an article manufactured from such a composition is known to produce a surface film or residue which unacceptably reduces transparency. In addition, the mechanical and physical properties of polyamides are know to change disadvantageously with increasing amounts of additives.

Halogen-free molded articles having reduced flammability and having a VO rating according to Underwriters Laboratories Specification UL-94 for the United States, are of particular interest for the electric and electronic industries. Good transparency of such molded parts represents an important and frequently required quality.

Published European Application No. 0 242 732 A1 provides reduced flammability to transparent molding materials made of amorphous polyamides, primarily of the type PA 6I/6T, by including high proportions of aromatic dicarboxylic acids in the composition. PA 6I/6T represents a polyamide including PA 6I, i.e., hexamethylenediamine and isophthalic acid, and 6T, i.e., hexamethylenediamine and terephthalic acid. Such aromatic dicarboxylic acids include isophthalic acid, terephlhalic acid, and especial polyphosphonates which are themselves synthesized from aromatic phenylene residues and thus may not be safe with respect to health. Despite the relatively high amounts of additives, however, these mixtures often do not reach the VO value for 0.8 mm thick test samples that is essential for industrial uses. Furthermore, with higher amounts of additives, polymer decomposition and reduced transparency become problematic and must be reckoned with. Injection-molded articles made from this prior art mixture have a tendency to be brittle due to the necessarily higher concentrations of aromatic polyphosphonates. This corresponds to a high rate of rejected material when producing thin parts for applications requiring thin parts.

In U.S. Pat. Nos. 3,789,091 and 3,849,368, various ring-shaped phosphonic acid esters are claimed as a flame-retarding additive for various homopolymers. These include phosphonate compounds such as ANTIBLAZE 1045 which is marketed by Albright and Wilson under the tradename ANTIBLAZE 1045. Polyethylene terephthalate, polyacrylonitrile, polyurethane, acetylcellulose, polystyrene and nylon 66 are mentioned as polymers (homopolymers) which may be made flame-retarding using such ring-shaped phosphonic acid esters as flame-retarding additive.

U.S. Patent Nos. 3,789,091 and 3,849,368, however, do not provide any information about amorphous, transparent polyamides which have a special structure and different behavior than the homopolymers discussed. These Patents do mentioned that phosphonic acid esters cause discolorations during the compounding of nylon 66 at temperatures ranging from 280° C. to 310° C. and that, when test samples are ignited, the fire-retardant character is not always found to be self-extinguishing. Frequently, however, this depends to a high degree on the adjustment of the angle of the flame and the positioning of the test sample.

Published European Application No. 0 631 538 B1 (which corresponds to U.S. application Ser. No. 08/002,290 (1993) and to International Publication No. WO 93/18,914) and International Publication No. WO 92/13,717 (which corresponds to U.S. application Ser. No. 08/000,511 (1992)) relate to multi-layered coatings for electrical use, such as especially for cables, made from polyolefins or polyvinylchloride and polyamides made flame-retardant with phosphonic acid esters of the type exemplified by ANTIBLAZE 1045. Exemplary polyamides named are primarily semi-crystalline polyamides, such as PA 6, PA 66, PA 610, PA 46, PA 69, PA 11, and PA 12, but mention is also made of an amorphous polyamide composed of certain aromatic diamines. Here too, the special structure and different behavior of amorphous polyamides is not mentioned, however. In particular, no mention is made of migration characteristics of this special class of flame-retardant additives, phosphonic acid esters of the type exemplified by ANTIBLAZE 1045. Also, no information is provided concerning the stability of the flame-retardant behavior as a function of temperature and humidity. However, a deterioration of the yield stress and the elongation at break qualities for nylon 6 made flame-retardant with ANTIBLAZE 1045 is demonstrated and is compared to untreated nylon. The VO rating according to Underwriters Laboratories Specification UL-94 for the United States is obtained definitely only starting with 15 weight % of ANTIBLAZE 1045, that is, only for 0.8 mm thick test samples that drop off faster than thicker test samples.

Mark Huggard of Albright and Wilson (marketer of ANTIBLAZE 1045) delivered a paper titled "New Phosphorus Fire Retardant For Nylon And Polyester Fibers And Other Goods" in 1993 in Atlanta, Ga., U.S.A. The paper reported that the characteristics of nylon 6 made flame-retardant with the phosphonic acid ester ANTIBLAZE 1045 are greatly reduced as a result of the plasticizing effect of this additive so that more moisture is absorbed and that brittleness and yellowing increase strongly during storage at temperatures of, for example, 100° C.

Our own compounding experiments, as well as observations by personnel processing polyamides, have shown that injection-molded parts produced from PA 6 or PA 12 and ANTIBLAZE 1045 sweat very strongly, especially after thermal storage. That is, a greasy coating develops on the surface due to migration of additives to the surface and the injection-molded parts develop yellow/brown discolorations.

From the product brochure for ANTIBLAZE 1045 marketed by Albright and Wilson, it can be seen that the evaporation rate of ANTIBLAZE 1045 at 300° C. is 7% because of the considerable presence of monomeric and dimeric products. Thus, it is recommended that no processing temperatures higher than 250° C. be used to avoid disintegration based on the thermogravimetric analysis curve (TGA curve). When higher temperatures are employed, a conversion to phosphonic acids must be expected as a result of hydrolysis of the phosphonic acid ester.

Based on our own findings, ANTIBLAZE 1045 discolors at 125° C. in 20 days from a transparent, light-colored liquid to a brown and very acidic one. Furthermore, and deviating from experience with polyesters, larger amounts of additives must be compounded in to achieve flame-retarding qualities with semi-crystalline polyamides, e.g., more than 12 weight %, more favorably from 15 to 20 weight %. This factor contributes conspicuously to a deterioration of the mechanical and physical qualities of these semi-crystalline polyamides when made flame-retardant. Further, the reasons why a stronger migration of the ANTIBLAZE 1045 to the surface is noted include, on the one hand, the lower absorption capability of the more compactly arranged semi-crystalline polyamides and, on the other hand, the higher absorption of moisture of the same. As a result of this, a sticky film forms on the surface of tool parts made from such materials, yellowing increases with rising environmental temperatures, and there is generally a loss of the VO character of the tool parts as they become deficient in ANTIBLAZE 1045.

It is therefore an object of the present invention to provide a polyamide composition which is amorphous and transparent, which has reduced flammability, and which has reduced migration of flame-retardant additive so that it is film-free.

It is another object of the present invention to provide a molded article which is molded from the foregoing polyamide composition, which is transparent, which has reduced flammability, and which has reduced migration of flame-retardant additive so that it is film-free.

It is yet another object of the present invention to provide a method of reducing flammability of an amorphous, transparent polyamide and of an article molded therefrom.

SUMMARY OF THE INVENTION

The present invention accomplishes these and other objects by providing a polyamide composition which is amorphous and transparent, which has reduced flammability, and which has reduced migration of flame-retardant additive so that it is film-free, the polyamide composition comprising at least one polyamide which contains cycloaliphatic monomer units, preferably those having 7 to 22 carbon atoms, and which is amorphous and transparent; and a flame-retardant additive which is present in an amount effective to reduced flammability of the polyamide composition, and which is at least one alkyl phosphonic acid compound having a general formula:

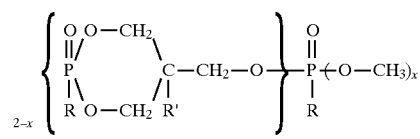

wherein R and R' each represent, independent of each other, an alkrl group having from 1 to 4 carbon atoms, and x=0 or 1.

The objects of the present invention are additionally accomplished by providing a method of reducing flammability of polyamides which are amorphous and transparent, the method comprising adding to at least one polyamide which contains cycloaliphatic monomer units and which is amorphous and transparent, a flame-retardant additive comprised of at least one alkyl phosphonic acid compound which is present in an amount effective to reduce flammability of the polyamide composition, and which is at least one alkyl phosphonic acid compound having a general formula as given above.

The objects of the present invention are additionally accomplished by providing a molded article which is transparent, which has reduced flammability, which has reduced migration of flame-retardant additive so that it is film-free, and which is comprised of the polyamide composition given in the foregoing. Advantageously, the molded article is one of a fiber, a cable, a plug, a disc, a profile, a pipe, and a hollow body.

The objects of the present invention are additionally accomplished by providing a method of reducing flammability of a molded article comprised of polyamides, the method comprising preparing a polyamide composition by adding to at least one polyamide which contains cycloaliphatic monomer units and which is amorphous and transparent, a flame-retardant additive comprised of at least one alkyl phosphonic acid compound which is present in an amount effective to reduce flammability of the polyamide composition, and which is at least one alkyl phosphonic acid compound having a general formula as given above; and molding the article from the polyamide composition.

As opposed to experience with semi-crystalline polyamides, surprisingly it was found that no migration of a particular class of flame-retardant additive occurs when incorporated in amorphous, transparent polyamides having a special chemical composition, namely, amorphous, transparent polyamides or copolyamides which contain cycloaliphatic monomer units, particularly cycloaliphatic monomer units having from 7 to 22 carbon atoms. This flame-retardant additive is an alkyl phosphonic acid compound, for example, the commercially available phosphonate ANTIBLAZE 1045 which is a phosphonic acid ester.

This class of flame-retardant additive, moreover, dissolves transparently despite the different respective densities. This was unexpected. Moreover, the amount of this additive necessary for achieving the desired VO character is advantageously lower than for the semi-crystalline polyamides. Further, the permanence of the flame-resistance is advantageously higher even after storage for several days at 70° to 100° C. That is, this flame-retardant additive exhibits reduced migration in amorphous, transparent polyamides so that the polyamide is substantially free of any surface film and it's transparency is preserved.

The cause for this advantageously reduced migration behavior of this phosphonic acid ester in amorphous, transparent polyamides is believed to be due to their structure. Amorphous material in general is characterized by the absence of a regular three-dimensional arrangement of molecules or sub-units of molecules extending over distances which are large compared to atomic dimensions, i.e., there is no long-range order, even though there may be a certain regularity of the structure on a local scale, i.e., short-range order. Thus, transparent, amorphous polyamides differ from semi-crystalline polyamides by having a varied arrangement of molecular chains. Also, the amorphous, transparent polyamides absorb considerably less moisture than semi-crystalline polyamides. This is advantageous because moisture is believed to entrain these water-soluble phosphonate additives and thus functions to increase their migration because the additive is induced to creep.

Another advantage of the inventive amorphous, transparent polyamide made flame-retardant with phosphonate additives, such as ANTIBLAZE 1045, is that there is considerably less yellowing even after storage at temperatures ranging from 80° C. to 100° C. over several days than for semi-crystalline polyamides. This is believed to be due to the lack of migration of the additive with accompanying formation of a film on the surface. Furthermore, the physical and mechanical properties advantageously experience substantially no change, i.e., at most only a slight change, with additive concentrations ranging from 4 to 10% weight % as is required to obtain the desired VO rating according to Underwriters Laboratories Specification UL-94 for the United States.

Thus, for amorphous, transparent polyamides of the type PA 12/MACM, PA 12/MACMI, PA 12/MACMT, PA 12T, PA 12/6T or PA 12/6T/6I only amounts of from 4 to 8 weight % of the additive are necessary to achieve VO in the standard combustion test for test samples of 0.8 mm thickness according to UL-94. Additional examples of amorphous, transparent polyamides according to this invention include those of the type PA 12/MACMI/MACMT, PA 6I, PA 6I/6T, PA 12/MACM36, PA NDT/INDT, PA NDI/INDI, and PA 6I/6T/MACMI. These amorphous polyamide type designations correspond to abbreviations for polyamides in accordance with ISO 1874-1 standard (see the Second Edition 1992 -03-01). In brief, "PA 12" stands for the well knowr PA 12, "MACM" stands for bis(methyl-para-aminocyclohexyl) methane, "I" stands for isophthalic acid, "T" stands for "terephthalic acid", "6", i.e., "PA 6", stands for hexamethylenediamine, "36" stands for a 36 carbon diacid, namely, dimeric acid, "ND" stands for trimethylhexamethylene diamine, and "IND" stands for isotrimethylhexamethylene diamine.

Polyamides according to the invention are understood to be amorphous, transparent polyamides that are composed of the monomers of PA 6, PA 11, but especially PA 12 and/or aliphatic diamines with 4 to 12 carbon atoms, cycloaliphatic diamines with 7 to 22 carbon atoms or araliphatic diamines with 6 to 22 carbon atoms and aliphatic dicarboxylic acids with 4 to 36 carbon atoms, cycloaliphatic dicarboxylic acids with 8 to 24 carbon atoms, and aromatic or araliphatic dicarboxylic acids with 8 to 20 carbon atoms. Polyamides according to the invention may additionally be amorphous, transparent polyamides that are composed of the monomers of PA 66, PA 69, PA 610, PA 612, and PA 1212. The transparent polyamides can also be blends of several transparent polyamides or of transparent polyamides with copolyamides or with semi-crystalline polyamides.

The flame-retardant additive is at least one alkyl phosphonic acid compound. Particularly useful are aliphatic polyol esters of alkylated phosphonic acids although a wide variety of alkyl phosphonic acid compounds are believed to be useful in the practice of this invention including a wide variety of aliphatic polyol esters of a wide variety of alkylated phosphonic acids. A preferred additive is the known trimethylolpropane ester of a methylphosphonic acid or methylphosphonic acid bis-((5-ethyl-2-methyl-1,3,2-dioxaphosphorinan-5-yl)-methyl) ester-P,P'-dioxide which has a total formula $C_{15}H_{31}O_9P_3$ and a CAS No. 42595-45-9. Such a material is sold by the American company Albright & Wilson under the trade name ANTIBLAZE 1045 or AMGARD P45 and is advertised as providing flame-retardant qualities primarily for polyethylene terephthalates (PET), polybutylene terephthalates (PBT), and polycarbonates (PC).

Articles produced from the inventive polyamide composition are generally molded articles made by conventional techniques and are not limited as to their form and dimensions. Neither are such articles unduly constrained with respect to the amount of flame-retardant additive which may be included in the polyamide composition in amounts ranging broadly from 0.5 to 40 weight % since the mechanical properties are only slightly influenced if at all. For example, additive amounts of approximately 5% by weight in the polymer do not influence the mechanical properties at all.

The inventive polyamide compositions can contain additional additives known from the prior art to be useful in polyamide compositions which may be necessary or helpful depending on the type of processing contemplated and the application intended for the product. Additional additives may include, by way of example but not limitation, plasticizers and diluents. Such additives should be selected so that they influence the transparency of the composition and article only slightly and preferably not at all. Such selection is well within the skill of artisan with at most only minimal experimentation.

Given the same conditions as above, the polyamides compositions may also contain further polymers including polycarbonates, polyesters, polystyrols, polyurethanes, polyacrylates, polymethylmethacrylates (PMMA), and vinyl polymers. Preferably, polyamide compositions are blends and include additional homopolyamides or copolyamides as constituents of the blend.

In addition, formed bodies can be produced from blends of the inventive polyamide compositions with other polymers, in particular those from the group of polyamides, polyesters, especially polyethylene terephthalate and polybutylene terephthalate, polycarbonates, polyvinyl chlorides, polyvinyl alcohols, polyacrylates, polyurethanes, polyolefins, in particular polyethylene and polypropylene, polybutadienes, polymethylpentenes and their mixtures or blends. The blends can be modified with additives according to the prior art, particularly from the group of compatibility agents, impact resistance modifiers, plasticizers, stabilizers, pigments, concentrating agents, and fillers.

The invention contemplates processing the inventive amorphous, transparent polyamide compositions for the production of low-flammable molded articles with processing methods known in the prior art, such as injection-molding, extruding, co-extruding, blow molding, injection-blow molding, pressing, and reshaping of any kind.

Advantageously, the VO rating according to Underwriters Laboratories Specification UL-94 for the United States for molded articles according to the invention is achieved even with 0.8 mm thick test samples.

DESCRIPTION OF THE PREFERRED EMBODIMENTS

The invention is described with greater particularity in the following examples:

EXAMPLE 1

GRILAMID TR55 from EMS-Chemie AG is a CoPA 12 MACMI (i.e., a copolymer of PA 12, bis(methyl-para-aminocyclohexyl)methane, and isophthalic acid) which is amorphous and transparent type, and which is available in granular form. GRILAMID TR55 was melted down in a WPF extruder of the production series ZSK30 at temperatures of around 275° C. In a sidestream, the additive ANTIBLAZE 1045 was kept liquid at a temperature ranging from 110° to 120° C. and was metered into the GRILAMID TR55 in an amount of 5 weight %. A strand of the resultant transparent polyamide composition was pulled from the extruder, was cooled in a water bath, and was crushed in a conventional granulator. The granular material was dried at 110° C. and had a transparent, light appearance and was observed to have no tendency either to sweat or to be sticky.

From this material, DIN test samples for measuring mechanical qualities and test samples for testing flammability according to UL-94 were produced with the aid of an Arburg 320/210/750 injection-molding machine. Control test samples of GRILAMID TR55 without the flame-retardant additive ANTIBLAZE 1045 were additionally prepared.

The test samples were transparent, without flaws, and resulted in mechanical values that deviated from the control sample of GRILAMID TR55 without flame-retardant additive by from 7 to 12%. The second order transition temperature was determined to be about 4° C. lower than for the control. The UL-94 flammability test resulted in the classification V0 for test samples measuring 127×12.7×0.8 mm or 127×12.7×1.6 mm even after 48 hours of storage in a standard operating environment, as well as after 30 days of storage at 70° C.

EXAMPLES 2–8

Additional amorphous, transparent granular materials from EMS-CHEMIE AG were formulated and tested in the same manner as in Example 1. These additional materials include:

GRILAMID TR55 LX (PA 12/PA 12 MACMI),
GRILAMID TR90 (PA MACM 12),
GIVIVORY G21 (PA 6I/6T),
GRIVORY XE3038 and XE3355 (two PA 6I/6T/MACMl types)
GRILAMID FE4230 (PA 12/6T type), and
GRILON TR2000 (PA MACMI/MACMX—see ISO 1874-1 standard, Second Edition 1992 -03-01 for the meaning of these standard abbreviations).

Samples including 5, 6.5 and 8 weight % of ANTIBLAZE 1045 were prepared and provided light-colored, transparent strands which, when dried, provided transparent granular material without film formation (i.e., no film due to migration of ANTIBLAZE 1045) and without stickiness, and having a low yellowing index of less than 30. The transparent test samples produced from this did not have a sticky film and testing of the mechanical properties showed that these samples deviated by less than 10% from the control samples. Advantageously, all of the test samples examined which included ANTIBLAZE 1045 were transparent and had a low flammability corresponding to a VO rating which means that the materials were self-extinguishing, according to the UL-94 test with 0.8 mm thick test samples and after 48 hours of storage in a standard operating environment, as well as after storage for 7 days at 70° C.

COMPARATIVE EXAMPLE 9

GRILON F40 (PA 6, B8367—see ISO 1874-1 standard, Second Edition 1992 -03-01 for the meaning of these standard abbreviations) from EMS-CHEMIE AG is a highly viscous polyamide with a solution viscosity of 3.6. This material was compounded with 6 weight % ANTIBLAZE 1045 and granulated with the aid of a ZSK30 extruder. The granules were dried at 100° C. and were sticky and had a yellow-orange appearance.

Test samples produced from this material were also sticky and had a yellowing index higher than 55. When storing the test samples for 8 days at 110° C., the stickiness and yellow discoloration increased strongly.

The test samples were tested in the same manner as in Example 1. The measured mechanical qualities resulted in a strong reduction in the cold impact resistance at –40° C., a strong reduction of the conditioned elongation at break by more than 60% as compared the GRILON F 40 control sample which included no ANTIBLAZE 1045, and an increase in the modulus of elasticity in tension by 15%. The combustion behavior of 0.8 mm test samples according to UL-94 resulted in the classification V2 after 48 hours of storage in a standard operating environment, as well as after 7 days of storage at 70° C.

COMPARATIVE EXAMPLE 10

Comparative Example 9 was repeated except that 10 weight % ANTIBLAZE 1045 (B 9257) was used instead of 6 weight %. The results were similarly negative, indeed, even worse with respect to the cold resistance at –40° C., the elongation at break, the yellow discoloration, and stickiness of the surface. The UL-94 flammability test supplied only a V2 rating across the board despite an increased amount of ANTIBLAZE 1045.

EXAMPLE 11

For another use application according to the invention, 10% GRILAMID TR55 (B 8747) was added to GRILON F40 prior to compounding with 6 weight % ANTIBLAZE 1045. The test samples were produced and tested in the same manner as in Example 1. The test samples made from the extruded and granulated material were still somewhat yellow and this yellowing increased even further during an 8-day storage at 110° C. However, surface stickiness was not present and the mechanical properties did not change by more than approximately 10%. In particular, -he elongation at break and the cold impact resistance at –40° C. maintained a high value of nearly 200% or were w.b. (without break). Also, all flammability ratings measured according to UL-94 on 0.8 mm thick test samples resulted in a V0 rating.

COMPARATIVE EXAMPLE 12

With the aid of a ZSK 30 extruder, 8 weight % of 110° C. ANTIBLAZE 1045 was added to granular GRILAMID L20 (PA 12, medium viscosity) from EMS-CHEMIE AG. The dried but sticky granular material was injection-molded into test samples. The measured mechanical properties of these test samples differed considerably from those measured for the control samples, i.e., the unmodified GRILAMID L20 samples. The test samples had yellow discolorations, and a sticky layer of migrated ANTIBLAZE 1045 could be detected on the surface of the test pieces and this sticky layer increased after storage at 110° C. for 48 days.

EXAMPLE 13

Example 12 was repeated with the variation that 17% by weight of amorphous, transparent GRILAMID TR55 granules were mixed into the GRILAMID L20 granules prior to compounding with 8 weight % of ANTIBLAZE 1045 according to the invention.

The test samples obtained from this composition were smooth, very light in color and not sticky. Also, no surface film of migrated ANTIBLAZE 1045 could be detected ever after storage for 8 days at a temperature of 110° C. The mechanical properties were good with respect to cold resistance and elongation at break, and the test samples had a low flammability rating of VO for 0.8 mm thick test samples according to UL-94.

EXAMPLE 14 (B9254)

By means of a ZSK30 extruder, 10 weight % of 110° C. ANTIBLAZE 1045 was added to a granular mixture of 50 weight % GRILON A23 (PA 6, medium viscosity), 10 weight % amorphous, transparent GRILAMID TR55, 30 weight % glass fiber VETROTEX P 327, and 0.5 weight % IRGANOX 1098. The resulting granular material was light in color and free of stickiness. Injection-molded test samples were produced from this composition which were opaque in color and had a smooth surface without a film of migrated ANTIBLAZE 1045. The viscosity of the test samples was 28 $kJ/m^2$, the impact strength when notched was 7.9 $kJ/m^2$, and the modulus of elasticity in tension was 10600 $N/mm^2$. The test samples did not have any stickiness on the surface even after 15 days of storage at 110° C. The flammability behavior according to UL-94 for 0.8 mm and 1.6 mm thick test samples resulted in a dry rating of V2 and a conditioned measured rating of V0.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A polyamide composition which is amorphous and transparent, which has reduced flammability, and which has reduced migration of flame-retardant additive to the surface thereof so that it is surface residue-free, the polyamide composition comprising:

at least one polyamide which contains cycloaliphatic monomer units and which is amorphous and transparent; and a flame-retardant additive which is present in an amount effective to reduced flammability of the polyamide composition, which is dissolved in the at least one polyamide, and which is at least one alkyl phosphonic acid compound having a formula:

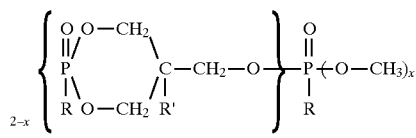

wherein R and R' each represent, independent of each other, an alkyl group having from 1 to 4 carbon atoms, and
   x0 or 1.

2. The polyamide composition according to claim 1, wherein the flame retardant additive is present in an amount ranging from 0.5 to 40% by weight based on total weight of the polyamide composition.

3. The polyamide composition according to claim 1, wherein the flame retardant additive is present in an amount ranging from 4 to 10% by weight based on total weight of the polyamide composition, whereby VO qualification in a Standard UL Burning Test is provided.

4. The polyamide composition according to claim 1, wherein the at least one alkyl phosphonic acid is methyl phosphonic acid bis-((5-ethyl-2-methyl-1,3,2-dioxaphosphorinan-5-yl)-methyl) ester-P-P' dioxide.

5. The polyamide composition according to claim 1, wherein the at least one polyamide containing cycloaliphatic monomer units comprises at least one first monomer unit in combination with at least one second monomer wherein at least one of the first monomer unit and the second meonomer unit is a cycloaliphatic monomer unit, wherein the at least one first monomer unit is selected from the group consisting of cycloaliphatic diamines having 7 to 22 carbon atoms and araliphatic diamines having 6 to 22 carbon atoms, and wherein the at least one second monomer unit is selected from the group consisting of aliphatic dicarboxylic acids having 4 to 12 carbon atoms, cycloaliphatic dicarboxylic acids having 8 to 24 carbon atoms, and aromatic dicarboxylic acids having 8 to 20 carbon atoms.

6. The polyamide composition according to claim 1, wherein the at least one polyamide comprises at least one monomer unit selected from the group consisting of:

(a) hexamethylene diamine,
   (b) 1,6-diamino-2,2',4-trimethylhexane,
   (c) 1,6-diamino-2,4,4'-trimethylhexane and halogenated derivatives thereof, and
   (d) bis-(p-aminocyclohexyl)methane, derivatives thereof which are alkyl homologs.

7. The polyamide composition according to claim 6, wherein the at least one polyamide comprises at least one monomer unit which is an alkylhomolog of bis-(p-aminocyclohexyl)methane and is selected from the group consisting of:

3,3'-dimethyl-4,4'-amino-dicyclohexylmethane,
   4,4'-diamino-dicyclohexyl-2,2'-propane, and
   3-aminomethyl-3,5 ,5-trimethylcyclohexylamine.

8. The polyamide composition according to claim 1, wherein the at least on polyamide comprises at least one additional monomer unit selected from the group consisting of:

PA 6 unit,
   PA 11 unit,
   PA 12 unit,
   PA 66 unit,
   PA 69 unit,
   PA 610 unit,
   PA 612 unit, and
   PA 1212 unit.

9. The polyamide composition according to claim 1, wherein the at least one polyamide is selected from the group consisting of:

PA 12 MACMI,
   PA 12 MACMT,
   PA 12 MACMI MACMT,

PA 12 MACM36, and

PA 6I 6T MACMI.

10. The polyamide composition according to claim 1, wherein the cycloaliphatic monomer units of the at least one polyamide have 7 to 22 carbon atoms.

11. A molded article which is transparent, which has reduced flammability, which has reduced migration of flame-retardant additive to the surface thereof so that it is surface residue-free, and which is comprised of the polyamide composition of claim 1.

12. A method of reducing flammability of polyamides which are amorphous and transparent, the method comprising:

adding to at least one polyamide which contains cycloaliphatic monomer units and which is amorphous and transparent, a flame-retardant additive comprised of at least one alkyl phosphonic acid compound which is present in an amount effective to reduce flammability of the polyamide composition, which is dissolved in the at least one polyamide, and which is at least one alkyl phosphonic acid compound having a formula:

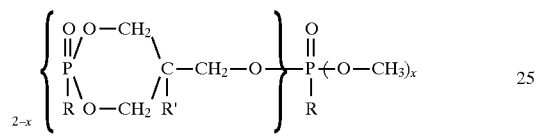

wherein R and R' each represent, independent of each other, an alkyl group having from 1 to 4 carbon atoms, and x=0 or 1.

13. A method of reducing flammability of a molded article comprised of polyamides, the method comprising:

preparing a polyamide composition by adding to at least one polyamide which contains cycloaliphatic monomer units and which is amorphous and transparent, a flame-retardant additive comprised of at least one alkyl phosphonic acid compound which is present in an amount effective to reduce flammability of the polyamide composition, which is dissolved in the at least one polyamide, and which is at least one alkyl phosphonic acid compound having a formula:

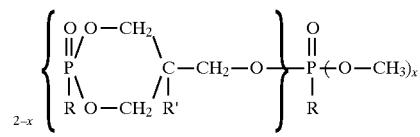

wherein R and R' each represent, independent of each other, an alkyl group having from 1 to 4 carbon atoms, and x=0 or 1; and molding the article from the polyamide composition.

14. The polyamide composition according to claim 1, wherein the flame retardant additive is present in an amount ranging from 5 to 12% by weight based on total weight of the polyamide composition.

* * * * *